US006417639B1

(12) United States Patent
Schillaci et al.

(10) Patent No.: US 6,417,639 B1
(45) Date of Patent: Jul. 9, 2002

(54) CONTROL CIRCUIT FOR A HARD DISK DRIVE HEAD

(75) Inventors: Luca Schillaci, Pavia; Maurizio Nessi, Como; Giorgio Sciacca, Pavia, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/564,307

(22) Filed: May 3, 2000

(51) Int. Cl.[7] ............................................... G05B 11/01
(52) U.S. Cl. ..................... 318/560; 318/439; 318/254; 318/138; 360/78.6; 360/78.8
(58) Field of Search ................................. 318/254, 560, 318/138, 600, 569, 439; 360/75, 78.6, 78.8, 264.7, 266.4, 294.5

(56) References Cited

U.S. PATENT DOCUMENTS 5,353,174 A * 10/1994 Uno ........................ 360/78.06
5,821,717 A * 10/1998 Hassan et al. .............. 318/560
5,838,515 A * 11/1998 Mortazavi et al. ......... 360/48.12
6,084,378 A * 7/2000 Carobolante ................ 318/811
6,229,373 B1 * 5/2001 Ng .............................. 327/333

OTHER PUBLICATIONS

Sedra & Smith, Microelectronic Circuits, Second Edition, HRW, N.Y., 1987, p. 32 & p. 103.*

* cited by examiner

Primary Examiner—Robert E. Nappi
Assistant Examiner—Rina I. Duda
(74) Attorney, Agent, or Firm—Lisa K. Jorgenson; Robert Iannucci; Seed IP Law Group PLLC

(57) ABSTRACT

A positioning system for a read/write head of a disk drive includes a rotatable data disk, a read/write head movable over the disk, a voice coil motor (VCM) connected to the head and a source of digital position signals. A control circuit includes means for generating a VCM control current, a sensor for sensing the VCM current and an amplifier having an inverting input connected to a reference voltage source through a resistor and to a sensor output, a non-inverting input connected to the source of digital position signals through a DAC and an output connected to an input of the drive means.

20 Claims, 2 Drawing Sheets

US 6,417,639 B1

CONTROL CIRCUIT FOR A HARD DISK DRIVE HEAD

TECHNICAL FIELD

The present invention relates to disk drives and, more particularly, to a control circuit in a system for positioning a read/write head of a hard disk drive.

BACKGROUND OF THE INVENTION

A hard disk drive comprises typically a plurality of rotatable disks with generally concentric data tracks containing digital information.

A head is associated with each disk for reading and writing data onto the various tracks when the disk is rotated and an actuator is connected to the head for moving the head to a desired track and maintaining it over the track centerline during read/write operations.

The actuator comprises typically a voice coil motor, or VCM, having a coil movable through the magnetic field of a permanent magnetic stator. The application of a current to the VCM causes the coil, and thus the head connected thereto, to move radially. The acceleration of the coil is proportional to the applied current, so that ideally no current flows through the coil if the head is stationary over a desired track.

FIG. 1 shows a known circuit for driving a VCM 10 which controls the position of a disk head. The VCM 10 is represented by a series connection of an inductor Lm (motor coil inductance) and a resistor Rm (motor coil ohmic resistance) and is powered by a power bridge amplifier, represented by two operational amplifiers 11 and 12 having gains G and −G, respectively. The amplifier 11 has its non-inverting input connected to the inverting input of the amplifier 12. The inverting input of amplifier 11 and the non-inverting input of amplifier 12 are connected to a source of a reference voltage VREF (not shown). A sensing resistor Rs is connected in series with the VCM 10 for providing a voltage signal to the input of a sense amplifier 13 having a gain Gs.

A control voltage is applied to the bridge amplifier through an error amplifier 14 having its non-inverting input coupled to the reference voltage VREF and its inverting input coupled to a source (not shown) of an analog voltage Vin through a series input resistor Ri. The output and the inverting input of error amplifier 14 are connected to one another through a series connection of a gain control resistor Rc and a frequency compensation capacitor Cc.

The output of sense amplifier 13 is connected to the inverting input of error amplifier 14 through a feedback resistor Rf.

In operation, a signal comprising information on the position which is desired for the disk head is applied as a voltage Vin to the error amplifier 14. The power bridge amplifier 11, 12 is driven by the output voltage from the error amplifier 14 and provides the VCM 10 with a current Im. The current Im is controlled through the feedback loop comprising the sense resistor Rs, the sense amplifier 13, the feedback resistor Rf and the error amplifier 14.

The transfer function of the circuit of FIG. 1 can be calculated as $$\frac{Im}{Vin} = -\frac{Rf}{Ri} * \frac{1}{Rs * Gs}$$

In a practical implementation of the circuit of FIG. 1 as a portion of an integrated circuit four pads are required for connection of external components, besides the pads for connection of the VCM 10 and the sensing resistor Rs. More particularly, one pad 15 is required to sense the reference voltage VREF for calibration and test purposes and three pads 16, 17 and 18 are required for connection of resistors Ri, Rc, Rf and capacitor Cc. In fact, resistors Ri, Rc, Rf should be high precision resistors and capacitor Cc should be a relatively large component; therefore they cannot be integrated with the rest of the circuit.

The present trend in the design of VCM control systems is towards the use of a digital signal instead of an analog signal for providing the head position information. To use the control circuit of FIG. 1 with a digital signal it is necessary to convert the digital signal into an analog signal. FIG. 2 shows the circuit of FIG. 1 with an input section comprising a digital-to-analog converter (DAC) 20 and a buffer 21. The DAC 20 has a digital input provided by a microprocessor 19 on a serial port and an analog output. The buffer 21 is necessary for coupling the high-impedance DAC output to the relatively low-impedance input of the control circuit.

The arrangement shown in FIG. 2 requires an additional pad 22 and an additional component (the buffer 21). The additional pad occupies area on the chip and implies that the control signal goes out from the chip and is subject therefore to external disturbances and the buffer occupies extra area and brings about offset problems which render the overall design more complex.

SUMMARY OF THE INVENTION

An embodiment of this invention provides a control circuit for a hard disk drive with digital input which does not require additional pads or additional components.

The control circuit includes drive means for generating a control current for use by the voice coil motor, sensor means for sensing the motor control current and amplifier means having an inverting input connected to a reference voltage source through resistance means and to an output of the sensor means, a non-inverting input connected to the source of digital position signals through digital-to-analog converting means and an output connected to an input of said drive means.

Objects and advantages of this invention will become more apparent from the following non-limiting description of an embodiment thereof to be read in conjunction with the accompanying drawings, in which like numerals represent the same or similar elements.

DETAILED DESCRIPTION OF THE INVENTION

Figure 1:
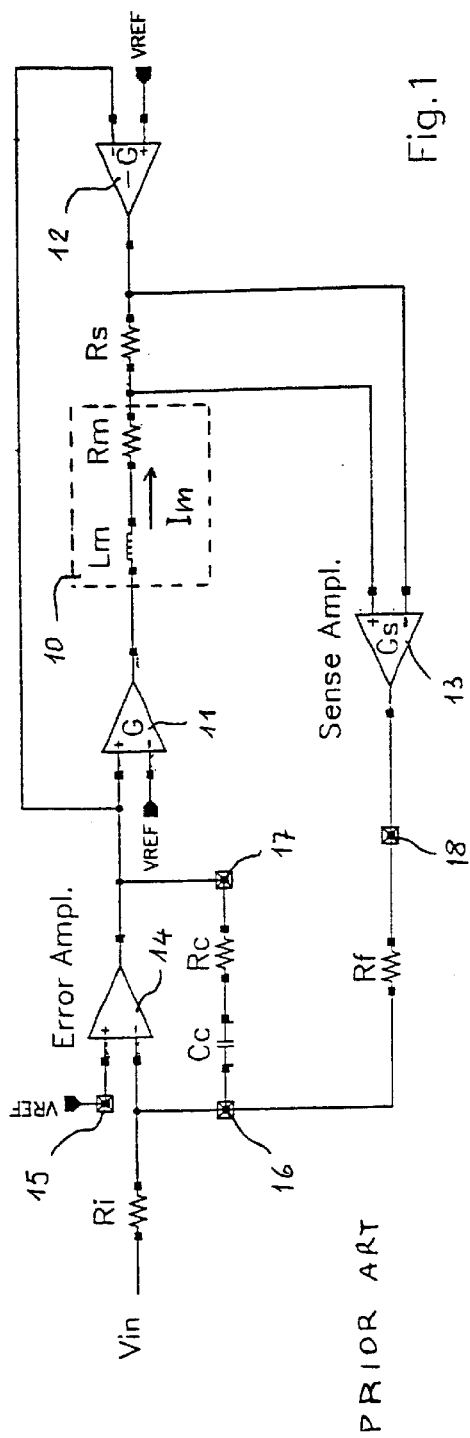
FIG. 1 is a diagram of a prior art control circuit for a voice coil motor.
Figure 2:
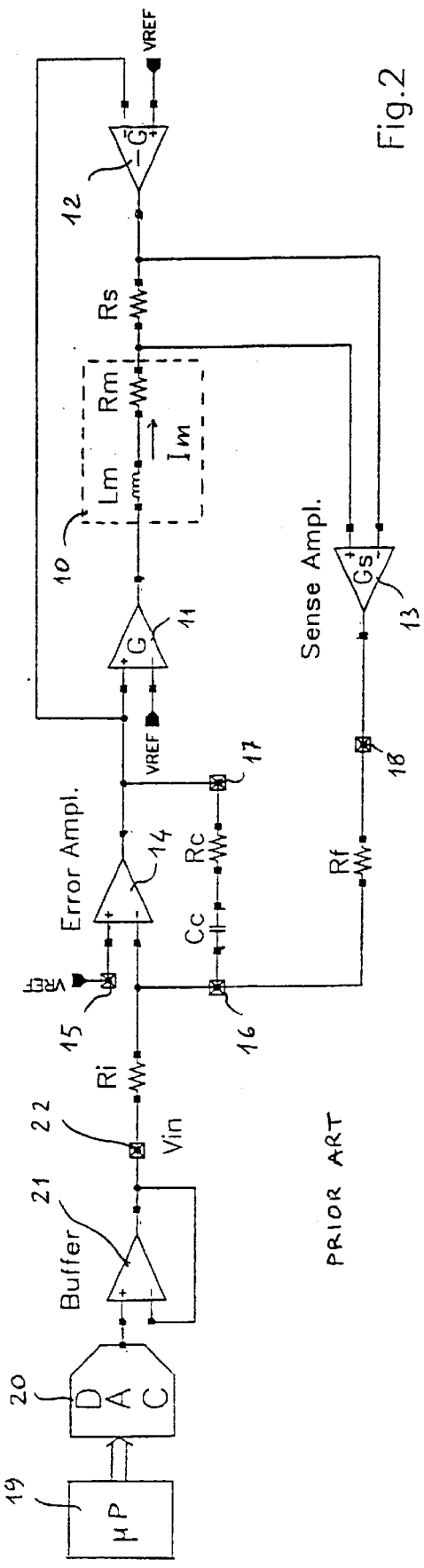
FIG. 2 is a diagram showing the control circuit according to FIG. 1 with a digital input section.
Figure 3:
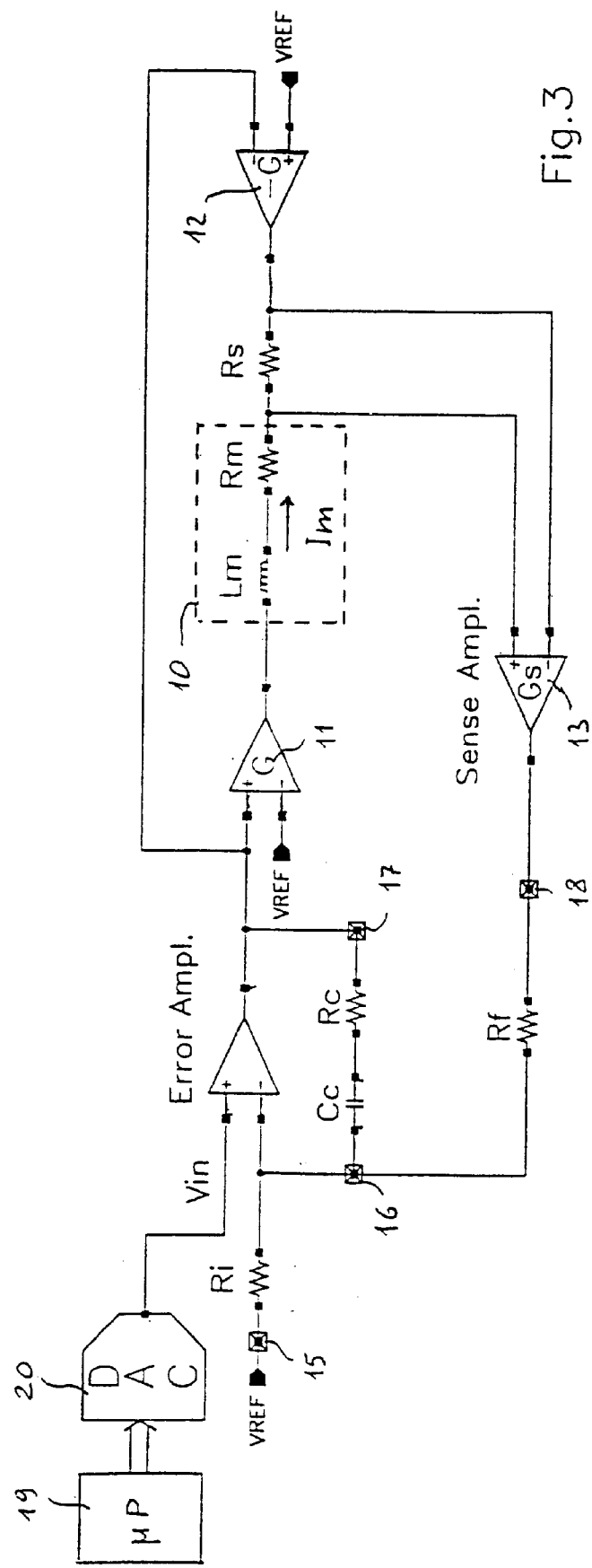
FIG. 3 is a diagram of a control circuit with digital input according to the invention.

FIG. 3 shows a circuit arrangement which differs from that of FIG. 2 for a few substantial features concerning the coupling of a digital control signal to the error amplifier 14. More particularly, the analog control signal Vin at the output of the DAC 20 is applied to the non-inverting input of the error amplifier 14 directly and the reference voltage VREF is applied to the inverting input of the error amplifier 14 through resistor Ri.

No buffer or impedance adapter is needed between the DAC 20 and the error amplifier 14 due to the very high impedance of the non-inverting input of amplifier 14 and no additional pads are necessary, if, of course, DAC 20 is part of an integrated circuit which comprises the control circuit.

It can be noted that the error amplifier 14 in the circuit shown in FIG. 3 is connected as a non-inverting amplifier, while the error amplifier 14 of FIG. 2 is connected as an inverting amplifier. This should be taken into account in order to connect the voice coil motor to the control circuit with the correct polarity, but does not change the basic operation principle of the circuit.

The transfer function of the circuit shown in FIG. 3 can be calculated as $$\frac{Im}{Vin} = \left(1 + \frac{Rf}{Ri}\right) * \frac{1}{Rs * Gs}$$

As is clear from the foregoing, the invention provides an efficient control circuit for a hard disk drive which can be operated with a digital input signal without recourse to additional pads or components, as required in the prior art control circuit with an analog input signal.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. In a positioning system for a read/write head of a disk drive including a rotatable data disk with generally concentric tracks thereon, a read/write head movable over the disk, a voice coil motor connected to the head for positioning the head relative to the data tracks and a source of digital position signals, a control circuit comprising:

drive means for generating a control current for use by the voice coil motor, sensor means for sensing the motor control current and amplifier means having an inverting input connected to a reference voltage source through resistance means and to an output of the sensor means, a non-inverting input connected to the source of digital position signals through digital-to-analog converting means and an output connected to an input of said drive means.

2. A control circuit according to claim 1, wherein said drive means includes a power bridge amplifier comprising two amplifier sections having respective outputs connected to said voice coil motor.

3. A control circuit according to claim 2, wherein said amplifier sections comprise first and second operational amplifiers, the first operational amplifier having an inverting input connected to a non-inverting input of the second operational amplifier and said reference voltage source, the first operational amplifier having a non-inverting input connected to an inverting input of the second operational amplifier.

4. A control circuit according to claim 2, wherein said sensor means includes a sensing resistor connected in series with said voice coil motor and sense amplifier means having two inputs connected across said sensing resistor and an output connected to said output of the sensor means through a feedback resistor.

5. A control circuit according to claim 1, wherein said amplifier means includes:

an operational amplifier having an inverting input and an output; and a feedback connection between the output and inverting input of the operational amplifier, said feedback connection comprising gain control resistance means.

6. A control circuit according to claim 5, wherein said feedback connection comprises a frequency compensation capacitance means.

7. A voice coil motor, comprising:

a voice coil;

a voice coil driver that drives a coil current through the voice coil;

a digital-to-analog converter having an input that receives a digital control signal and an output at which an analog control signal is produced; and an input amplifier having an output coupled to the voice coil driver, an inverting input connected to a reference voltage source, and a non-inverting input connected to the output of the digital-to-analog converter.

8. The voice coil motor of claim 7 wherein the voice coil driver includes a power bridge amplifier comprising two amplifier sections having respective outputs connected to the voice coil.

9. The voice coil motor of claim 8 wherein the amplifier sections comprise first and second operational amplifiers, the first operational amplifier having an inverting input connected to a non-inverting input of the second operational amplifier and to the reference voltage source, the first operational amplifier having a non-inverting input connected to an inverting input of the second operational amplifier.

10. The voice coil motor of claim 7, further comprising:

a sense resistor connected in series with the voice coil; and a sense amplifier having two inputs connected across the sensing resistor and an output connected to the inverting input of the input amplifier.

11. The voice coil motor of claim 7, further comprising a feedback connection between the output and inverting input of the input amplifier, the feedback connection comprising a gain control resistance element.

12. The voice coil motor of claim 11 wherein the feedback connection comprises a frequency compensation capacitance element.

13. The voice coil motor of claim 7 wherein the output of the digital-to-analog converter is directly connected to the non-inverting input of the input amplifier.

14. A voice coil motor, comprising:

a voice coil;

a voice coil driver that drives a coil current through the voice coil;

a digital-to-analog converter having an input that receives a digital control signal and an output at which an analog control signal is produced;

a sense amplifier having an input and output, the input being coupled to the voice coil, the sense amplifier being structured to sense the coil current and produce at the sense amplifier output a signal indicative of the sensed coil current; and an input amplifier having an output coupled to the voice coil driver, a first input connected to the sense amplifier output and to a reference voltage source, and a second input connected to the output of the digital-to-analog converter.

15. The voice coil motor of claim 14 wherein the voice coil driver includes a power bridge amplifier comprising two amplifier sections having respective outputs connected to the voice coil.

16. The voice coil motor of claim 15 wherein the amplifier sections comprise first and second operational amplifiers, the first operational amplifier having an inverting input connected to a non-inverting input of the second operational amplifier and to the reference voltage source, the first operational amplifier having a non-inverting input connected to an inverting input of the second operational amplifier.

17. The voice coil motor of claim 14, further comprising:

a sense resistor connected in series with the voice coil, wherein the sense amplifier includes first and second inputs connected across the sense resistor; and a feedback resistor connected between the output of the sense amplifier and the first input of the input amplifier.

18. The voice coil motor of claim 14, further comprising a feedback connection between the output and first input of the input amplifier, the feedback connection comprising a gain control resistance element.

19. The voice coil motor of claim 14 wherein the output of the digital-to-analog converter is directly connected to the second input of the input amplifier.

20. The voice coil motor of claim 14 wherein the first and second inputs of the input amplifier are inverting and non-inverting inputs, respectively.

* * * * *